Sept. 20, 1949.   L. COOPER   2,482,466
FISH LURE
Filed March 13, 1948
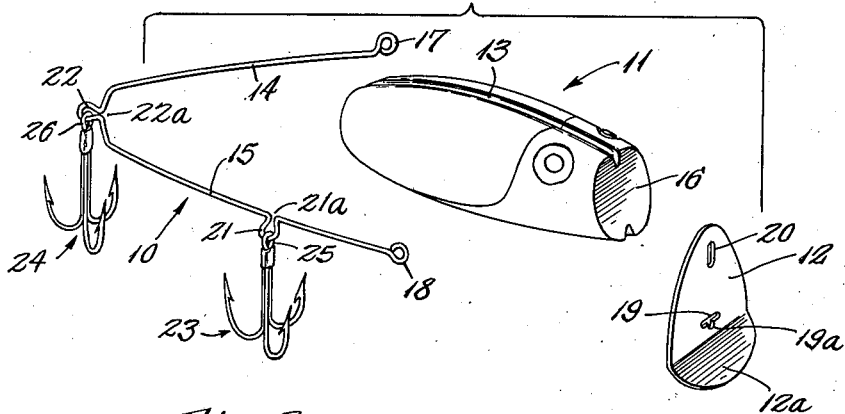
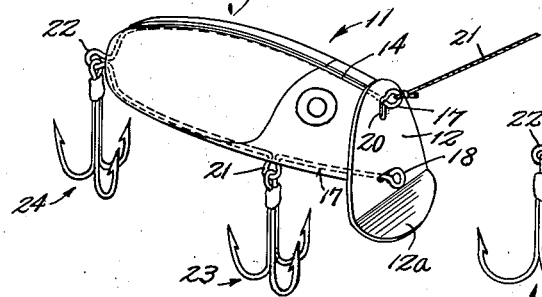
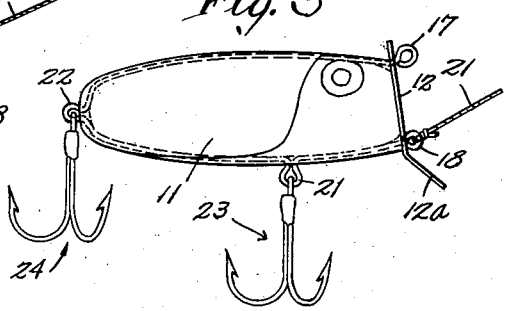
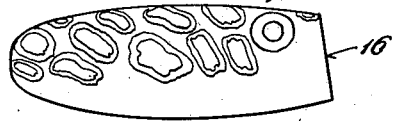
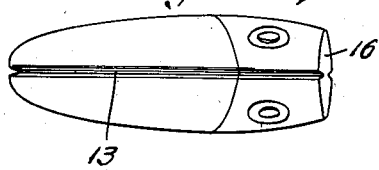
INVENTOR.
Leo Cooper
BY
Johnson and Kline
ATTORNEYS Patented Sept. 20, 1949

2,482,466

UNITED STATES PATENT OFFICE 2,482,466

FISH LURE

Leo Cooper, Stamford, Conn.

Application March 13, 1948, Serial No. 14,697

14 Claims. (Cl. 43—42.36)

The present invention relates to a fish lure of the type having a hook-carrying harness which may be detachably connected to a fish lure body whereby the harness and bodies of different design may be readily interchanged as desired.

According to the present invention, the harness is simple in construction and is secured to the body by a novel and effective locking means which, while preventing accidental separation of the harness in use, may be readily released when it is desired to change the lure body. Further, the harness is provided with hook-receiving means which support and hold the hooks thereon in predetermined relation and yet permit ready removal and replacement of the hooks thereon as desired.

The lure of the present invention may be used as a surface lure, an underwater lure, or a "popper" without modifying the structure of the same.

Other features and advantages of the invention will be apparent from the specification and claims when considered in connection with the drawings in which:

Figure 1 shows an exploded view of the fish lure of the present invention.

Fig. 2 is a perspective view of the assembled lure.

Fig. 3 is a side elevation of the assembled lure.

Fig. 4 is a side elevation of another design of body.

Fig. 5 is a top view of the body of Fig. 1.

Fig. 6 is a side elevation of another body design.

As shown in the drawings, the lure comprises a harness 10 and a lure body 11 secured thereto. In the preferred form of the invention the harness 10 comprises a U-shaped member which is adapted to fit in a harness-receiving means on the top, back and bottom of the lure body 11 and is clamped thereto by yoke 12. The harness is made of resilient spring wire and is adapted to fit in the harness-receiving means which is herein illustrated as a groove 13 extending along the top and bottom and across the back of the body. The body may be made of wood, plastic or other similar buoyant material and is painted, colored or shaped to produce bodies of different design such as shown in Figs. 1, 4 and 6.

The legs 14, 15 of the U are of such a length that, when the harness is in position in the groove with the bow in engagement with the back of the body, they project beyond the front face 16 of the body and are interlocked and the harness clamped to the body by the yoke 12.

The interlock is accomplished by forming the projecting ends of the legs 14, 15 with enlargements such as eyelets 17, 18 and by forming the yoke as a plate with apertures 19, 20 for receiving the eyelets. The apertures are spaced apart a distance less than the space between the ends as shown in Fig. 1 so that when the legs are brought together and disposed in the apertures the resiliency of the legs will keep the legs pressing against the outer edges of the apertures and maintain the yoke and ends in interlocked relation. Also when the eyelets have been passed through the apertures, the legs of the harness are drawn together into tight engagement in the groove and the resiliency of the legs pulls the plate into clamping relation with the front face of the plug body.

The hook-carrying harness is provided with novel means for supporting hooks therefrom whereby the hooks are held in predetermined position but may be readily removed and new hooks or hooks of different design or weight, as determined by the type of fishing to be done, may be associated therewith. This novel means comprises a U-shaped loop 21 formed in the leg 15 intermediate the ends thereof and a U-shaped loop 22 formed in the body of the U to project therefrom. Each of these loops is adapted to have the hook means 23, 24 suspended therefrom with the eyelets 25, 26 disposed in the loop. The loops 21, 22 are sufficiently large to provide free movement of the hooks thereon but have the upper ends 21a, 22a substantially closed as shown in Fig. 1 so that the hooks cannot become dislodged from the loop and displaced along the leg or bow by the pull of a hooked fish. When it is desired to change the hooks on the harness, however, it is merely necessary to snap the eyelets 25, 26 by the ends 21a, 22a of the loops and thread the hooks along the legs to the ends and the replacement are threaded along the legs and snapped through the openings 21a, 22a in the end of the loops 21, 22 and into the loop.

In the preferred form of the invention the aperture 19 extends transversely of the plane of the eyelet 18. Thus, any pull by a fish on the leg 15 cannot cause the eyelet to pull or cam through the aperture. However, the aperture permits ready assembly of the device as follows: The plate 12 is rotated through 90° and the aperture passed over the eyelet 18. The plate is then returned back through 90° and the wire drops into the notch 19a which maintains it in center position with respect to the plate. The plug body is positioned in the harness with the legs and bow disposed in the groove. The end 17 is then moved toward the other leg and passed through the vertical aperture 20 wherein it snaps back to the position shown in Fig. 3.

When it is desired to remove the lure body, it is merely necessary to depress the eyelet 17 and move the plate away from the base 16 until the eyelet passes through the aperture 20 to release the clamping action of the harness on the body.

It will be noted in this connection that any downward movement as may be occasioned by the weight of the fish on hook means 23 will tend to pull the leg 14 downwardly in the groove and also will tighten the action between the top of aperture 20 and the end of the leg 14 to increase the locking action of the yoke or plate while the transverse aperture 19 prevents eyelet 18 from being pulled out by the weight.

Pull of a fish on hook means 24 which is located at the middle of the bow of the U will cause the U to tend to flatten out and draw the legs tighter against the body while the plate is drawn against face 16 and restricts any rearward movement. Thus the harness cannot be accidentally released while in use by the weight or pull of the fish thereon.

In the preferred form of the lure the front face 16 of the body is inclined rearwardly from the lower edge of the body as shown in Fig. 3 and the plate overlying the body is flat and extends outwardly beyond the sides of the body. The bottom portion 12a of the plate projects below the body and forwardly so as to form an obtuse angle with the plane of the face. This structure permits the plug to be used either as a surface lure or as an underwater lure without modification.

When the line 21 is connected to the eyelet 18 as shown in Fig. 3 the lure will ride on the surface of the water with the usual wiggling action. If the line is given a sudden jerk, due to the relation of the plate and body, it will provide the desired popping sound of a "popper" lure. If, however, the line is connected to the eyelet 17 as in Fig. 2 this will cause the lure to tilt and because of the shape of the plate it will descend a predetermined distance under the water and move through the water in submerged position.

Variations and modifications may be made within the scope of this invention and portions of the improvements may be used without others.

I claim:

1. A fishing lure of the plug type comprising a body having harness-receiving means thereon; a U-shaped hook-carrying harness disposed in the harness-receiving means with the ends of the harness extending beyond the front of the body; and a yoke engaging and directly connected to each end of the harness and interlocked with said ends and securing the harness to the body.

2. A fishing lure of the plug type comprising a body having harness-receiving means thereon; a U-shaped hook-carrying harness disposed in the harness-receiving means with the ends of the harness provided with abutments and extending beyond the front of the body; and a plate detachably interlocked with said abutments and securing the harness to the body.

3. A fishing lure of the plug type comprising a body having harness-receiving means thereon; a U-shaped hook-carrying harness of spring wire disposed in the harness-receiving means with the ends of the harness formed into eyes and extending beyond the front of the body; and a plate overlying the front of the body and detachably interlocked with said eyes to secure the harness to the body.

4. A fishing lure of the plug type comprising a body having a harness-receiving groove extending along the top, bottom and around the back thereof; a U-shaped hook-carrying harness disposed in the harness-receiving groove with the ends of the harness extending beyond the front of the body; and a yoke extending between and directly connected to each end and interlocked with said ends to secure the harness to the body.

5. A fishing lure of the plug type comprising a body having a harness-receiving groove extending along the top, bottom and around the back thereof; a U-shaped harness disposed in the harness-receiving groove with the ends of the harness extending beyond the front of the body, the bow of the U-shaped harness and the leg disposed in the bottom groove having hook-receiving loops formed therein; hooks suspended from the loops; and a yoke having a portion directly connected to and extending around each leg and interlocked with said ends and securing the harness to the body.

6. A fishing lure of the plug type comprising a body having a harness-receiving groove extending along the top, bottom and around the back thereof; a U-shaped harness disposed in the harness-receiving groove with the ends of the harness extending beyond the front of the body and the leg of the U-shaped harness lying in the bottom groove having a U-shaped loop; hook means having an eye disposed in the loop to be suspended thereby; and a yoke having separate apertures each receiving a leg of the harness and interlocked with said ends and securing the harness to the body.

7. A fishing lure of the plug type comprising a front face inclined rearwardly from its lower edge; a body having a harness-receiving groove on the top, bottom and back thereof; a U-shaped resilient hook-carrying harness disposed in the harness-receiving groove with the ends of the harness extending beyond the front of the body and provided with enlarged eyes; and a plate overlying the front face and interlocked with said ends to secure the harness to the body and clamp the plate to the front face.

8. An interchangeable harness for fish lures comprising a U-shaped member having enlargements at the ends thereof; a yoke detachably interconnecting the enlargements; and hooks suspended from the harness.

9. An interchangeable harness adapted to extend around the body of a fish lure comprising a U-shaped spring wire member having enlargements at the ends thereof; a rigid plate extending between and detachably interconnecting the ends; and hooks detachably suspended from the harness.

10. An interchangeable harness for fish lures comprising a U-shaped spring wire member having line connecting eyelets formed at the ends thereof; a plate having eyelet receiving apertures for interconnecting the ends; and hooks suspended from the harness and detachably connected thereto.

11. An interchangeable harness for fish lures comprising a U-shaped spring wire member having eyelets formed at the ends thereof; a plate interconnecting the ends of the member, said plate having a pair of eyelet receiving apertures therein, one aperture extending transversely of the plane of one of the eyelets whereby said one eyelet can be passed therethrough only upon the plate being rotated through 90°; and hooks carried by said member.

12. An interchangeable harness for fish lures comprising a U-shaped spring wire member having eyelets formed at the ends thereof and a hook receiving portion on one leg of the U-shaped wire; a hook connected thereto; and a rigid plate interconnecting the ends of the member, said plate having a pair of eyelet receiving apertures therein, the aperture receiving the hook carrying leg of the U-shaped wire extending transversely of the plane of the eyelet thereon whereby the said eyelet can be passed therethrough only upon the plate being rotated through 90° and is held thereby against being withdrawn therefrom by a pull on the hook.

13. An interchangeable harness for fish lures comprising a U-shaped spring wire member having enlargements formed at the ends thereof and lying in the plane of the member; and a plate interconnecting the ends of the member, said plate having enlargement-receiving apertures therein, one aperture extending transversely of the plane of the enlargement whereby the enlargement can be passed therethrough only upon the plate being rotated through 90° and the other aperture being perpendicular thereto and spaced therefrom to permit the other enlargement to pass therethrough when the ends of the member are moved toward one another.

14. A fishing lure of the plug type comprising a body having harness-receiving means thereon; a U-shaped hook-carrying harness of spring wire disposed in the harness-receiving means with the ends of the harness formed into eyes and extending beyond the front of the body; and a plate overlying the front of the body and detachably interlocked with said eyes to secure the harness to the body, said plate having a portion extending below the edge of the body and forming an obtuse angle with the remainder of the plate and the enlarged eyes being located adjacent the top and bottom of the plate and forming line-attaching means whereby the lure, when the line is secured to the bottom eye, rides on the surface of the water and when the line is attached to the top eye the lure descends below the surface of the water.

LEO COOPER.

REFERENCES CITED

The following references are of record in the file of this patent:

UNITED STATES PATENTS

| Number | Name | Date |
|---|---|---|
| 765,482 | Hardy | July 19, 1904 |
| 1,394,313 | Leeper | Oct. 18, 1921 |
| 2,217,565 | Seigle et al. | Oct. 8, 1940 |
| 2,220,133 | Sweeney | Nov. 5, 1940 |